(12) United States Patent
Grauer et al.

(10) Patent No.: US 9,753,141 B2
(45) Date of Patent: Sep. 5, 2017

(54) GATED SENSOR BASED IMAGING SYSTEM WITH MINIMIZED DELAY TIME BETWEEN SENSOR EXPOSURES

(71) Applicant: Brightway Vision Ltd., Haifa (IL)

(72) Inventors: Yoav Grauer, Haifa (IL); Ofer David, Haifa (IL); Eyal Levi, Haifa (IL)

(73) Assignee: Brightway Vision Ltd., Haifa (IL)

( * ) Notice: Subject to any disclaimer, the term of this patent is extended or adjusted under 35 U.S.C. 154(b) by 0 days.

(21) Appl. No.: 15/316,998

(22) PCT Filed: May 18, 2015

(86) PCT No.: PCT/IL2015/050526
§ 371 (c)(1),
(2) Date: Dec. 7, 2016

(87) PCT Pub. No.: WO2015/198300
PCT Pub. Date: Dec. 30, 2015

(65) Prior Publication Data
US 2017/0115395 A1   Apr. 27, 2017

(30) Foreign Application Priority Data

Jun. 24, 2014 (IL) .......................................... 233356

(51) Int. Cl.
*G01S 7/48* (2006.01)
*G01S 17/89* (2006.01)
*G01S 7/486* (2006.01)
*G01S 11/12* (2006.01)

(52) U.S. Cl.
CPC ............ *G01S 17/89* (2013.01); *G01S 7/4865* (2013.01); *G01S 7/4868* (2013.01); *G01S 11/12* (2013.01)

(58) Field of Classification Search
CPC ........ G01S 17/89; G01S 7/483; G01S 7/4863; G01S 7/4865; G01S 7/4868; G01S 11/12
See application file for complete search history.

(56) References Cited

FOREIGN PATENT DOCUMENTS

| IL | 177078 | | 8/2012 |
|---|---|---|---|
| IL | 177078 A | * | 8/2012 |

* cited by examiner

*Primary Examiner* — Krystine Breier
(74) *Attorney, Agent, or Firm* — Mintz Levin Cohn Ferris Glovsky and Popeo, P.C.; Adam P. Samansky; Jonathon P. Western (57) ABSTRACT

Active or passive gated-sensor imaging system characterized by a minimized time period between successive sensor exposures. In the active imaging system, a light source emits light pulses toward a region of interest, and an image sensor receives reflections of the pulses reflected from objects located in a DOF to be imaged and converts the reflections into an image. Each frame of the image includes a plurality of gating cycles. Each gating cycle includes the emission of a respective light pulse and the reception of reflections of the respective pulse. A delay-time ($T_{DELAY}$) is defined as the duration between the sensor exposure periods of successive gating cycles. A controller controls the operation of the light source and the image sensor, to minimize the delay-time for at least one gating cycle of an image frame, where the delay-time is adaptively determined in accordance with at least one system parameter or environmental condition.

19 Claims, 8 Drawing Sheets

GATED SENSOR BASED IMAGING SYSTEM WITH MINIMIZED DELAY TIME BETWEEN SENSOR EXPOSURES

CROSS-REFERENCE TO RELATED APPLICATIONS

This application is a National Phase application filed under 35 U.S.C. §371 of PCT International Application No. PCT/IL2015/050526 with an International Filing Date of May 18, 2015, which claims priority to Israel Patent Application No. 233356, filed on Jun. 24, 2014, the entire contents of which are incorporated herein by reference.

FIELD OF THE INVENTION

The present invention relates to imaging systems in general, and to active illumination or passive imaging systems with gated imaging, in particular.

BACKGROUND OF THE INVENTION

Night vision imaging systems produce visible images of an environment having minimal ambient light, which would otherwise not be visible to the human eye. Such systems are used by military and law enforcement units, as well as various civilian applications. One such application is for improving the visibility of a vehicle driver during night, rain, fog, or other poor visibility driving conditions. The generated image of the area surrounding the vehicle may be processed to provide various driver assistance and safety features, such as: forward collision warning (FCW), lane departure warning (LDW), traffic sign recognition (TSR), and the detection of relevant entities such as pedestrians or oncoming vehicles. The image may also be displayed to the driver, for example projected on a head-up display (HUD) on the vehicle windshield. A vehicle night vision system may also be used to enable autonomous driving at low light levels or poor visibility conditions.

An imaging system may be passive or active. Some passive imaging systems operate by amplifying the existing low level ambient light in the environment to produce a visible video image (i.e., a reflected image). Other passive imaging systems are based on a thermal or infrared camera, which senses differences in infrared radiation emitted by objects in the surrounding area, and generates a video image according to the sensed radiation differences (i.e., an emitted image). An active imaging system involves transmitting light from a light source to illuminate the environment, and accumulating the reflected light by an imaging sensor, providing a visible image even when there is virtually no existing ambient light in the environment. The light source, which may be, for example, an LED, a filtered light bulb, or a laser, may transmit the light in the form of continuous wave (CW) or in a series of pulses.

Contemporary image sensors are typically semiconductor based, such as charge-coupled devices (CCD), or active-pixel sensors (APS) produced using the complementary metal-oxide-semiconductor (CMOS) or the N-type metal-oxide-semiconductor (NMOS) processes. Examples of such image sensors include: Intensified-CCD (ICCD)/Intensified-CMOS (ICMOS); Electron Multiplying CCD (EMCCD); Electron Bombarded CMOS (EBCMOS); Hybrid FPA (CCD or CMOS, such as InGaAs, HgCdTe); and Avalanche Photo-Diode (APD) focal plane array. In a CMOS sensor, each array pixel is associated with respective electronic components and circuitry for converting the incident light into a corresponding electrical charge, including a photodetector, an active amplifier, a capacitor, and switching components to readout the photodetector integrated charge. Each pixel group in the sensor array may be independently controlled to collect the incident radiation and integrate the charge for a selected exposure, where the pixel data undergoes readout after an entire frame has been captured. In comparison to camera tube sensors (e.g., photomultiplier, image intensifier based sensors, or light multipliers), CCD/CMOS image sensors are generally lower cost to produce and can function satisfactorily in a variety of environments and temperature conditions (e.g., daylight operation), as they are less susceptible to saturation, blooming effects and loss of sensitivity. An additional drawback of camera tube sensors is the "screen burn-in" effect, caused by the inability of the intensifier to handle a constant high level input of photons. Typically, when an image intensifier is activated in daytime (without optical or electrical protection) the tube would burn out in minutes. Likewise, a constant bright object may also cause a burn area (spot) in the image intensifier.

The technique of synchronizing the illumination pulses with the camera activation in active imaging systems in order to image a particular depth of field, also known as "gated imaging", is known in the art. This technique is disclosed, for example, in U.S. Pat. No. 7,379,164 to Inbar et al., entitled "Laser gated camera imaging system and method"; in U.S. Pat. No. 7,733,464 to David et al., entitled "Vehicle mounted night vision imaging system and method"; in U.S. Pat. No. 8,194,126 to David et al., entitled "Gated imaging"; in PCT Patent Application Publication No. WO2013/157001 to Grauer et al., entitled "Multiple gated pixel per readout"; and in PCT Patent Application Publication No. WO2013/179280 to Grauer et al., entitled "Gated imaging using an adaptive depth of field". After the illumination pulse is transmitted, the camera remains in an off state (i.e., does not accumulate any reflected photons), while the pulse reaches the target area and light is reflected back toward the camera. When the reflected light is due to arrive at the camera, the camera is activated to open (i.e., accumulates reflected photons). After the pulse is received, the camera is turned back off, while awaiting the transmission and reflection of the subsequent illumination pulse. The camera remains off for the duration of time required for the pulse to travel toward the target area and be reflected back, and is subsequently activated only for the duration required to receive the reflected light from the desired depth of field. In this manner, the camera receives only reflections from the desired range, and avoids reflections from other objects, such as particles in the atmosphere which may cause backscattering and reduce the contrast of the target area in the generated image. Gated imaging may also be employed to diminish the potential for oversaturation and blooming effects in the sensor, by collecting fewer pulses from shorter distances, thereby lowering the overall exposure level of the camera to near-field scenery and avoiding high intensity reflections from very close objects. Similarly, the light intensity or the shape of the illumination pulse may be controlled as a function of the distance to the target object, ensuring that the intensity of the received reflected pulse is at a level that would not lead to overexposure of the image sensor.

Each image frame generally includes multiple gating cycles, where each cycle consists of a pulse transmission/reflection and a respective sensor exposure to collect the reflected pulse. The pulse width and exposure duration is determined as a function of various relevant parameters, including the desired depth of field to be imaged. During the period when the camera sensor is not exposed (i.e., while the light pulse may still be propagating through the atmosphere), the sensor ideally will not accumulate any photons. But in practice, a certain level of residual light may still enter the image sensor or be accumulated by the image sensor (i.e., signal charge can be stored in the memory node without being contaminated by parasitic light). This phenomenon of "leakage photons" is especially problematic in CMOS sensors, where it is difficult to mask the memory node (MN) and floating diffusion in the pixel level sensor (typical masking approaches include: micro-lens focusing light away from the MN, metal layers above the MN, potential attracting the photoelectrons to the photodiode, and potential barriers around the MN). Therefore, a relatively long non-exposure period (i.e., sensor "off" time) serves to increase the extent of accumulated residual photons, which increases the noise in the acquired image. Conversely, an exposure duration (sensor "on" time) that is too long will result in image degradation ("overexposure"). Therefore, minimizing the time period between the exposures of successive gating cycles would lead to a reduction of noise in the acquired image frame. A typical time-span of a single gating cycle for an image sensor in active imaging systems (e.g., the duration between successive pulse transmissions) is primarily a function of the imaging application, but is typically in the range of: hundreds of picoseconds (ps) to a few microseconds (µs).

The issue of residual photon accumulation during sensor non-exposure periods is particularly relevant to vehicle camera based imaging and especially for night vision systems, such as when facing the headlights of an oncoming vehicle, or more acutely when facing an oncoming vehicle with its own active imaging system (and associated light source), which would likely result in significant accumulation of these undesired light sources. Existing techniques for overcoming this issue primarily rely on spectral filters and high dynamic range (HDR) image sensors.

When there is relative motion between the camera and an imaged object (e.g., if the object is moving and/or the camera is moving), a single exposure image tends to result in blurring, as the moving object appears smeared across the image. Removing the motion blur effect via deconvolution is an ill-posed problem due to lost spatial frequencies in the original image. One approach for overcoming motion blurring involves rapidly opening and closing the camera shutter throughout the exposure duration in accordance with a binary pseudo-random sequence, as described in: Raskar, Ramesh, et al., "Coded Exposure Photography: Motion Deblurring using Fluttered Shutter", ACM SIGGRAPH 2006 Papers, SIGGRAPH '06. (2006):795-804.

SUMMARY OF THE INVENTION

In accordance with one aspect of the present invention, there is thus provided an active imaging system that includes at least one light source, at least one image sensor, and a controller. The light source is configured to emit a series of light pulses toward a region of interest. The image sensor includes an array of photodetectors, configured to receive reflections of the pulses reflected from objects located in at least one depth of field (DOF) to be imaged, and to convert the reflections into an image. Each frame of the image includes a plurality of gating cycles. Each gating cycle includes the emission of a respective pulse of the series of light pulses, and the reception of reflections of the respective pulse by the image sensor. A delay time (TDELAY) is defined as the duration between the sensor exposure periods of successive gating cycles. The controller is configured to control the operation of the light source and the image sensor, and to minimize the delay-time (TDELAY) for at least one gating cycle of an image frame, where the delay time (TDELAY) is adaptively determined in accordance with at least one system parameter or environmental condition. The system parameter may include: the pulse width; the pulse intensity; the pulse shape; the DOF; the maximum range to be imaged; intrinsic parameters of the light source; intrinsic parameters of the image sensor; the sensitivity of the image sensor; the frame rate of the image sensor; the type of scenery to be imaged; a type of image processing feature; and/or a mathematical formula. The environmental condition may include: the time or location of operation; weather or climate conditions; the type of platform containing the imaging system; the application of the imaging system; the level of ambient light; the presence of extraneous light sources in the vicinity; and/or the planned duration of an operational session. The imaging system may include a plurality of light sources, each being configured to emit a respective pulse for a different gating cycle of the image frame, such that the timing of the pulse emissions from different light sources is staggered. At least one image frame may include gating cycles with varying cycle durations (TCYCLE), such that the delay-time (TDELAY) is selectively varied in at least some of the gating cycles. The cycle duration (TCYCLE) of at least a portion of the gating cycles that are dedicated to a farther DOF may be longer than the cycle duration (TCYCLE) of at least another portion of the gating cycles that are dedicated to a shorter DOF. The pulses emitted by the light source may include a plurality of pulse wavelengths, respective of different pixels of the image sensor photodetector array. The imaging system may further include at least one filter, configured to filter the received reflections from reaching the image sensor according to selected filtering criteria. The imaging system may further include a display, configured to display the generated image. The imaging system may be mounted in a vehicle. A plurality of the imaging systems may operate together in a common environment, where the timing of parameters relating to an image frame of at least one of the imaging systems is determined in accordance with a random hopping scheme.

In accordance with another aspect of the present invention, there is thus provided a passive imaging system that includes at least one image sensor and a controller. The image sensor includes an array of photodetectors, configured to receive radiation emitted or reflected from objects located in a region to be imaged, and to convert the received radiation into an image. Each frame of the image includes a plurality of gating cycles. Each gating cycle includes a respective exposure period of the image sensor. A delay-time ($T_{DELAY}$) is defined as the duration between the sensor exposure periods of successive gating cycles. The controller is configured to control the operation of the image sensor, and to minimize the delay-time ($T_{DELAY}$) for at least one gating cycle of an image frame, where the delay-time ($T_{DELAY}$) is adaptively determined in accordance with at least one system parameter or environmental condition. The system parameter may include: intrinsic parameters of the image sensor; the sensitivity of the image sensor; the frame rate of the image sensor; the type of scenery to be imaged; a type of image processing feature; and/or a mathematical formula. The environmental condition may include: the time or location of operation; weather or climate conditions; the type of platform containing the imaging system; the application of the imaging system; the level of ambient light; the presence of extraneous light sources in the vicinity; and/or the planned duration of an operational session.

In accordance with a further aspect of the present invention, there is thus provided a method for active imaging. The method includes the procedure of emitting a series of light pulses toward a region of interest, using at least one light source. The method further includes the procedure of detecting the reflections of the pulses reflected from objects located in at least one depth of field (DOF) to be imaged, and converting the reflections into an image, using at least one image sensor. Each frame of the image includes a plurality of gating cycles. Each gating cycle includes the emission of a respective pulse of the series of light pulses, and the reception of reflections of the respective pulse by the image sensor. A delay-time ($T_{DELAY}$) is defined as the duration between the sensor exposure periods of successive gating cycles. The method further includes the procedure of minimizing the delay-time ($T_{DELAY}$) for at least one gating cycle of an image frame, where the delay-time ($T_{DELAY}$) is adaptively determined in accordance with at least one system parameter or environmental condition. The procedure of minimizing the delay-time ($T_{DELAY}$) may include selectively varying the delay-time in at least some of the gating cycles of an image frame such that the image frame includes gating cycles with varying cycle durations ($T_{CYCLE}$).

In accordance with yet a further aspect of the present invention, there is thus provided a method for passive imaging. The method includes the procedure of receiving radiation emitted or reflected from objects located in a region to be imaged, and converting the received radiation into an image, using at least one image sensor. Each frame of the image includes a plurality of gating cycles. Each gating cycle includes a respective exposure period of the image sensor. A delay-time ($T_{DELAY}$) is defined as the duration between the sensor exposure periods of successive gating cycles. The method further includes the procedure of minimizing the delay-time ($T_{DELAY}$) for at least one gating cycle of an image frame, where the delay-time ($T_{DELAY}$) is adaptively determined in accordance with at least one system parameter or environmental condition.

BRIEF DESCRIPTION OF THE DRAWINGS

The present invention will be understood and appreciated more fully from the following detailed description taken in conjunction with the drawings in which.

DETAILED DESCRIPTION OF THE EMBODIMENTS

The present invention overcomes the disadvantages of the prior art by providing a gated-sensor imaging system configured to selectively adjust the time period between sensor exposures in successive gating cycles, in accordance with relevant criteria and environmental conditions. The imaging system of the present invention may operate in a burst-mode operation characterized by a minimized time period between successive sensor exposures, which serves to mitigate the issue of residual photon accumulation during sensor non-exposure periods and thus reduce the level of noise in the acquired image.

Figure 1:
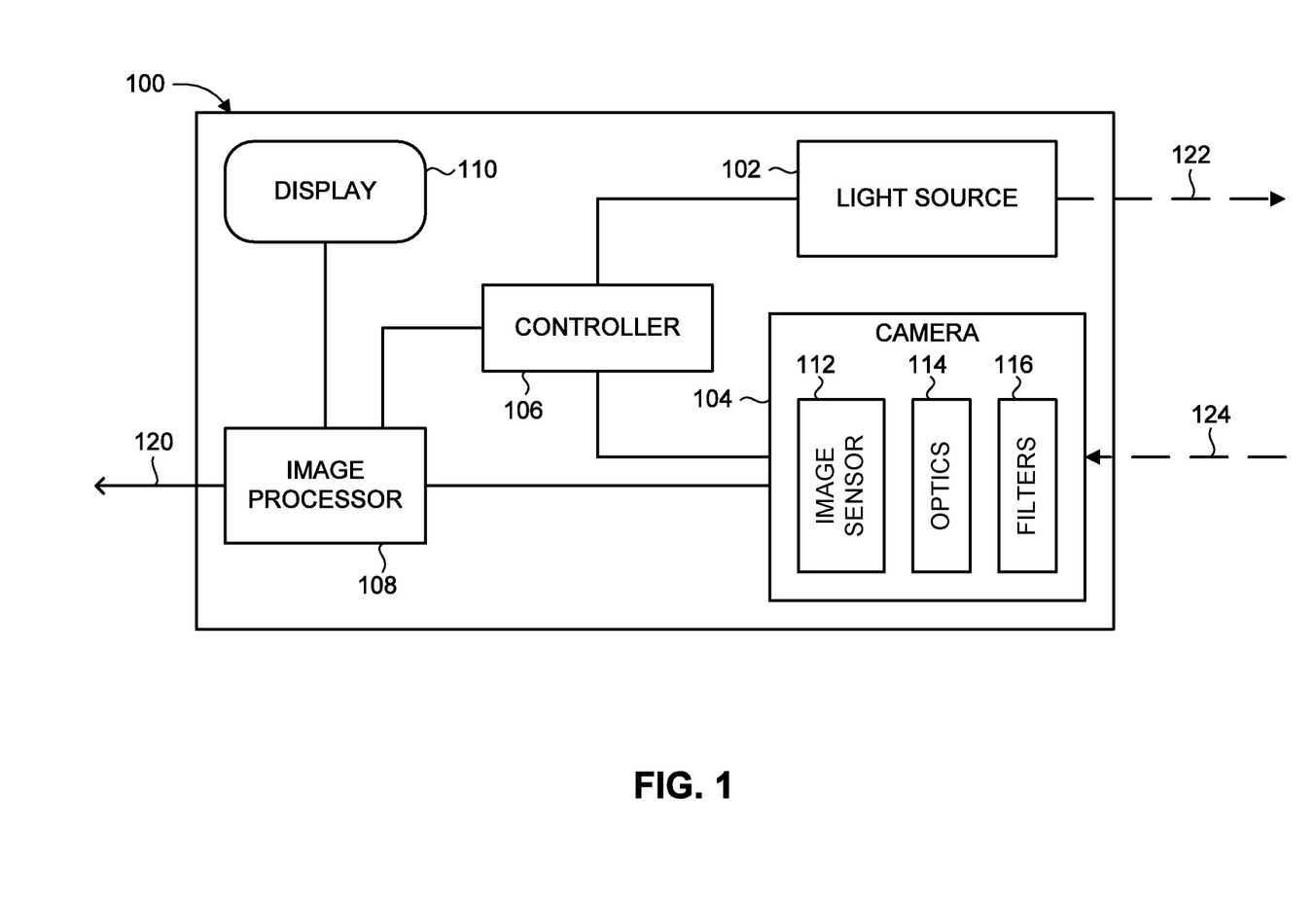
FIG. 1 is a schematic illustration of a gated active imaging system, constructed and operative in accordance with an embodiment of the present invention.

Reference is now made to FIG. 1, which is a schematic illustration of a gated active imaging system, generally referenced 100, constructed and operative in accordance with an embodiment of the present invention. Imaging system 100 includes at least one light source 102, at least one camera 104, a controller 106, an image processor 108, and a display 110. Controller 106 is coupled with light source 102 and with camera 104. Image processor 108 is coupled with camera 104, with controller 106, and with display 110.

Figure 2:
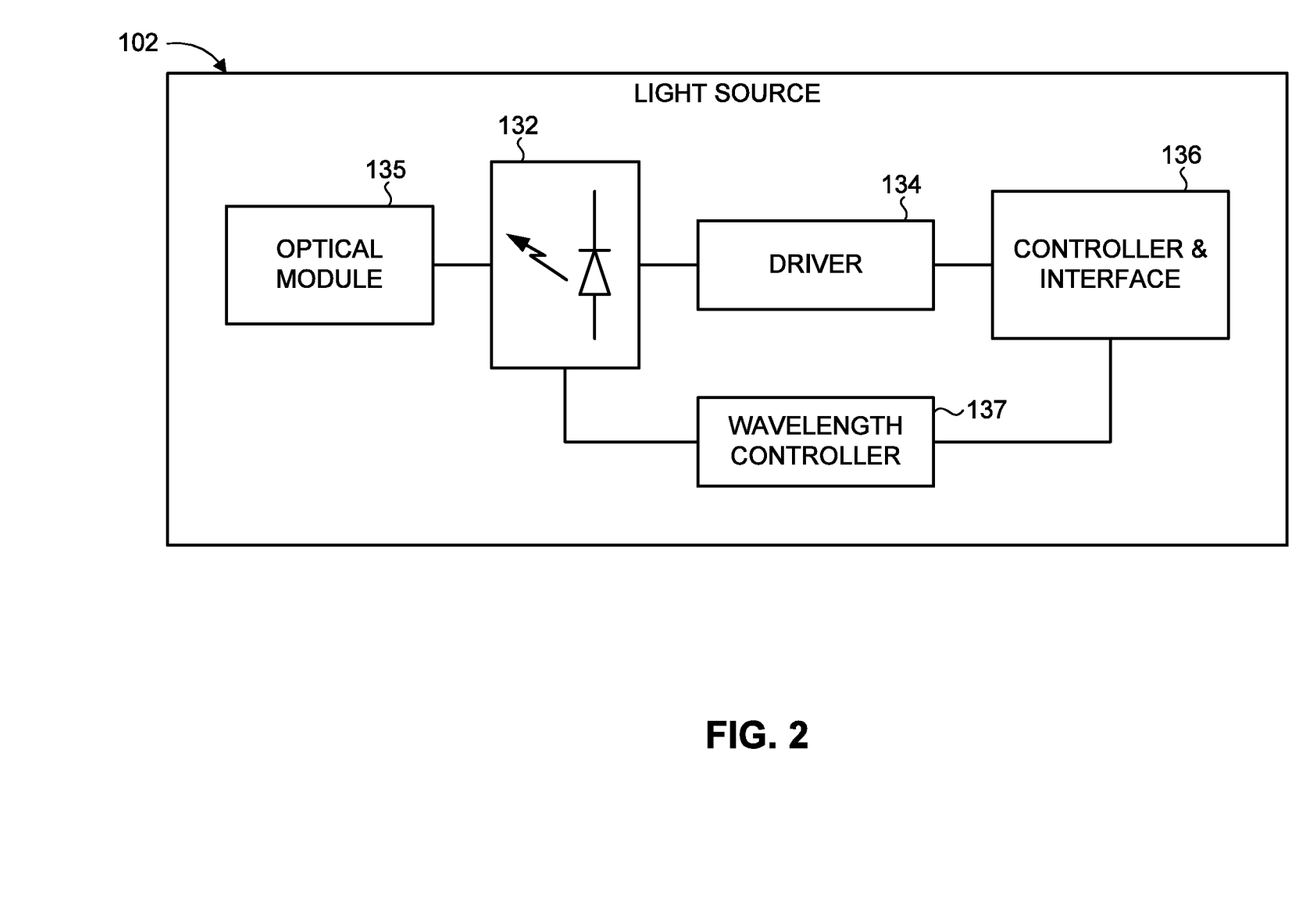
FIG. 2 is a schematic illustration of a detailed view of the light source in the imaging system of FIG. 1, operative in accordance with an embodiment of the present invention.

Light source 102 emits a series of light pulses, such as light pulse 122, toward an area to be imaged by system 100. Light source 102 may include a laser diode, such as an edge-emitting semiconductor laser or a vertical-cavity surface-emitting laser (VCSEL). It is appreciated that a laser-based light source allows filtering out non-laser light receptions, as opposed to, for example, LED light sources. A VCSEL is a semiconductor laser in which the light beam is emitted perpendicular to the active surface, in contrast to edge-emitting lasers that are characterized by beam emission parallel to the active surface. VCSEL lasers offer a similar spectral width to edge-emitting lasers while being far less sensitive to temperature deviations, which obviates the need for constant temperature monitoring to ensure stability. While the imaging system of the present invention is described for exemplary purposes with reference to laser light pulses, any suitable pulsed emission of electromagnetic energy radiation may be used instead, including: light in the visible or non-visible spectral ranges, infrared radiation, ultraviolet (UV) radiation, X-ray radiation, gamma radiation, microwave radiation, radio waves, and the like. For example, light source 102 may alternatively include a light-emitting display (LED) or a gas-discharge lamp. The particular characteristics of the emitted light may be selected in accordance with the area of interest and the environmental conditions. For example, the pulse width, the intensity (peak power), the polarization and/or the shape of the illumination pulse 122 may be controlled as a function of the distance to the target object to be imaged (i.e., the desired depth of field). The emitted pulse 122 may be in any suitable wavelength range, such as near infrared (NIR), short wave infrared (SWIR), or mid infrared (MIR). More generally, imaging system 100 may include a plurality of light sources 102, having similar or different characteristics (e.g., each being configured to produce pulses in different wavelengths), and which may be directed to operate separately or in unison. Reference is made to FIG. 2, which is a schematic illustration of a detailed view of the light source 102 in imaging system 100, operative in accordance with an embodiment of the present invention. Light source 102 includes a laser diode 132, a laser driver 134, an optical module 135, a controller/interface 136, and a wavelength controller 137. Laser diode 132 produces coherent laser radiation (e.g., in the IR spectrum), or non-coherent laser radiation in order to avoid speckle patterns (e.g., using an array of emitters, by an integrating sphere, etc.). Laser driver 134 delivers a current to drive the operation of laser diode 132. Controller/interface 136 controls the operation of laser diode 132 and/or laser driver 134. Controller/interface 136 may include a communication interface to the vehicle communication bus, adapted to control and/or provide built-in-tests status. Controller/interface 136 may include a physical or wireless interface to the system controller 106 for synchronization of emitted light pulses 122. Optical module 135 is adapted for projecting and/or filtering light polarization. Optical module 135 is further adapted for diffusing the light (e.g., via a holographic diffuser, optical lenses, and/or other suitable optical components), and projecting the light in a selected field of illumination (FOI). Wavelength controller 137 (if required) may use any suitable mechanical, optical and/or electrical (e.g., a thermo-electric cooler) mechanism or technique for stabilizing the illumination wavelengths. In order to fulfill laser safety requirements, light source 102 may reduce the emitted optical power (e.g., pulse peak power, pulse width, number of pulses per time) as a function of relevant parameters, such as: vehicle speed, location, detected objects, and the like.

Figure 3:
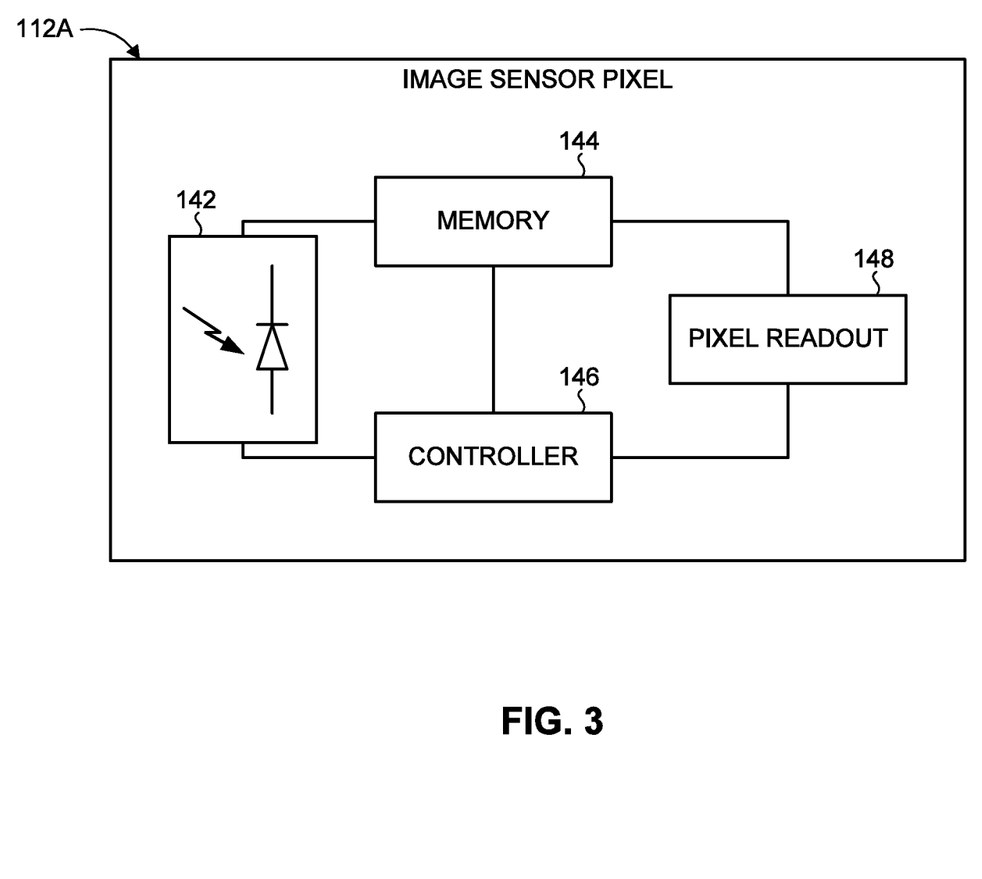
FIG. 3 is a schematic illustration of a detailed view of an individual pixel within the image sensor of the imaging system of FIG. 1, operative in accordance with an embodiment of the present invention.

Referring back to FIG. 1, camera 104 receives reflected light, such as reflected light pulse 124, reflected from objects illuminated by the emitted light pulses 122, and generates an image of the scene. Camera 104 includes a gated imaging capability, such that it is synchronized to be "on" (i.e., receive light) during the period when the reflected pulses from a specific distance are due to arrive at the camera, and "off" (i.e., not receive light) during other times, thereby providing for imaging at a particular depth of field relative to the location of system 100. Camera 104 includes at least one image sensor 112 that accumulates the reflected light pulses. Image sensor 112 may be a CMOS-based active-pixel sensor array, with each pixel including its own photodetector and associated components. Alternatively, image sensor 112 may be a hybrid sensor (e.g., an indium gallium arsenide (InGaAs) based photodetector, a mercury cadmium telluride (MCT) based photodetector, and the like), with or without gain. More generally, image sensor 112 may be any type of device capable of acquiring and storing an image representation of a real-world scene, including the acquisition of any form of electromagnetic radiation at any range of wavelengths (e.g., light in the visible or non-visible spectrum, ultraviolet, infrared, radar, microwave, RF, and the like). Image sensor 112 is operative to acquire at least one image frame, such as a sequence of consecutive image frames representing a video image, which may be converted into an electronic signal for subsequent processing and/or transmission. Accordingly, the term "image" as used herein refers to any form of output from an aforementioned image sensor, including any optical or digital signal representation of a scene acquired at any spectral region. Reference is made to FIG. 3, which is a schematic illustration of a detailed view of an individual pixel, referenced 112A, within the image sensor 112 of imaging system 100, operative in accordance with an embodiment of the present invention. Pixel 112A includes a photodiode 142, a memory 144, a controller 146, and pixel readout 148. Photodiode 142 is at least a single element which converts photons into a photoelectric signal. Photodiode 142 may be with or without gain (e.g., based on potential or any other gain mechanism). Photodiode 142 may be a pinned diode or any other type of light sensing/converting mechanism. Pixel memory 144 may provide the functionalities of signal accumulation and signal pre-processing. Signal accumulation is applicable for storing an accumulated signal (i.e., photoelectrons) from at least one photodiode 142. Signal accumulation may be adapted to operate per a single pixel exposure or per multiple pixel exposures. Signal pre-processing may provide HDR processing and/or adaptive signal threshold related processing (e.g., once the signal has passed a certain threshold and/or up to a certain threshold). Pixel controller 146 controls the operation of pixels based on a waveform scheme. Pixel readout 148 provides the interface to read the stored accumulated/preprocessed pixel signal. Pixel readout 148 may operate in parallel (simultaneously) to the pixel exposure(s), or sequentially, i.e., after the pixel exposure(s). Pixel 112A may operate in a "gated" mode and/or in a "standard" mode (i.e., a single exposure per pixel readout). Pixel 112A may further include optical elements and a configurable module (not shown). Optical elements of pixel 112A may include, for example: micro-lenses, spectral filters, and a plasmonic device. A configurable module of pixel 112A may control different parameters, such as: the pixel internal power supplies (e.g., for varying performance), pixel internal memory configuration, and the waveform of controller 146.

Referring back to FIG. 1, camera 104 further includes relevant optics 114 configured to direct reflected light pulses 124 to image sensor 112 (e.g., lenses, mirrors, fiber optics, waveguides, and the like). Camera 104 may further include various filters 116, operative for filtering out light based on relevant filtering criteria. For example, camera 104 may include a bandpass filter, for filtering out undesired wavelengths (e.g., wavelengths that differ from that of the emitted light pulses 122). Camera 104 may also include a spectral filter, such as to direct selected wavelengths to different pixels of image sensor 112. For example, some pixels may be configured to receive the reflected pulses 124 in the NIR spectrum, while other pixels are configured to receive visible light. Camera 104 may further include a polarization filter, in conjunction with a light source 102 that emits polarized light, such that the polarization filter passes through to image sensor 112 only received light that conforms to the expected polarization of the emitted light pulses 122. It is noted that filters 116 may be implemented on the pixel array of image sensor 112. For example, a spectral filter 116 may be embodied by a repeating cluster of a 2 by 2 pixel array, with the cluster repeating itself upon a portion (or the entirety) of the image sensor array, where, for example, the first pixel configured to receive light in the Blue spectrum, the second pixel is configured to receive light in the Green spectrum, the third pixel is configured to receive light in the Red spectrum, and the fourth pixel is configured to receive light in the NIR spectrum (i.e., the same as the NIR light source 102 generating laser pulses 122/124).

The imaging characteristics (e.g., field of view, sensitivity, resolution, focal length) of camera 104, and/or the components thereof, may be selected in accordance with the area of interest and the environmental conditions. Imaging system 100 may generally include a plurality of cameras 104, or a single camera 104 with a plurality of image sensors 112, which may be directed to operate separately or in unison (e.g., to provide stereoscopic vision). For example, camera 104 may include a plurality of image sensors 112 with different characteristics (e.g., multiple image sensors with different sensitivities, different FOVs, and/or different spectral filters).

Light source 102 and camera 104 may be housed in the same location or in separate locations. For example, system 100 may be installed in a vehicle in a "forward looking" configuration, where camera 104 is situated behind the windshield while light source 102 is disposed as a fog lamp or inside an existing headlamp at the front grille. Alternatively, system 100 may be installed in a vehicle in a "rear looking" configuration, where camera 104 and light source 102 are disposed in the rear bumper or in the vehicle taillights. Further alternatively, camera 104 and light source 102 may be integrated within a single housing, such as in a mobile communication device (e.g., a mobile phone camera).

Controller 106 dynamically controls the operation of light source 102 and camera 104. For example, controller 106 synchronizes the emission of laser pulses 122 by light source 102 with the exposure of camera 104 for implementing active gated imaging. Controller 106 also sets the various parameters of the transmitted laser pulse 122, such as the pulse start time, the pulse duration (i.e., pulse width), the number of pulses per image frame, and the pulse shape and pattern. Controller 106 may adjust the image frame rate of camera 104, establishing the number of image frames acquired per second and/or the type of each image frame. Controller 106 may also selectively operate imaging system 100 in an active mode (i.e., with transmission of pulses 122 by light source 102) or in a passive mode (i.e., without operation of light source 102). Controller 106 also establishes the illumination level for each acquired frame and for each portion (or "slice") of a frame, such as by controlling the number of transmitted light pulses and collected reflections for each frame slice, controlling the number of image frame slices within each frame, and/or controlling the exposure duration of camera 104 as well as the timing of the exposure with respect to the transmitted light pulse. Controller 106 also controls the gain of image sensor 112, such as using an automatic gain control (AGC) mechanism. In general, controller 106 may dynamically adjust any parameter as necessary during the course of operation of imaging system 100. Controller 106 may be integrated in a single unit together with camera 104 and/or with image processor 108.

Image processor 108 performs any necessary processing or analysis on the image frames acquired by camera 104 and generates a final image. For example, image processor 108 may be configured to help provide various driver assistance features in a vehicle night vision system, such as: forward collision warning (FCW), lane departure warning (LDW), traffic sign recognition (TSR), pedestrian or vehicle detection, and the like. Display 110 displays the generated image to a user of system 100. The displayed image may be combined with the ambient scenery, allowing the user to view both the display image and the ambient scene simultaneously, while maintaining external situational awareness. For example, display 110 may be a head-up display (HUD), such as a HUD integrated in a vehicle windshield of a vehicle-mounted night vision system. Furthermore, the acquired images may undergo fusion with relevant data to provide the vehicle driver with alerts or notifications (e.g., visual or audio) and/or to present augmented reality (AR) data (e.g., symbols/graphics/text/imagery relating to the driving environment). Display 110 is optional and image processor 108 may alternatively send the image to another system component (such as a memory) or to a remote location via data communication channel 120. Data communication channel 120 may be coupled to the system platform, such as in accordance with the CAN bus and/or on-board diagnostics (OBD) protocols in a vehicle, or a wireless protocol in a mobile communication device.

Imaging system 100 may optionally include and/or be associated with additional components not shown in FIG. 1, for enabling the implementation of the disclosed subject matter. For example, system 100 may include a power supply (not shown) for providing power to the various components, and may further include a memory or storage unit (not shown) for temporary storage of image frames or other types of data. System 100 may also include a user interface (not shown), for allowing a user of system 100 to control various parameters or settings associated with the components of system 100.

The components and devices of imaging system 100 may be based in hardware, software, or combinations thereof. It is appreciated that the functionality associated with each of the devices or components of system 100 may be distributed among multiple devices or components, which may reside at a single location or at multiple locations. For example, the functionality associated with controller 106 or image processor 108 may be distributed between multiple controllers or processing units.

Figure 4:
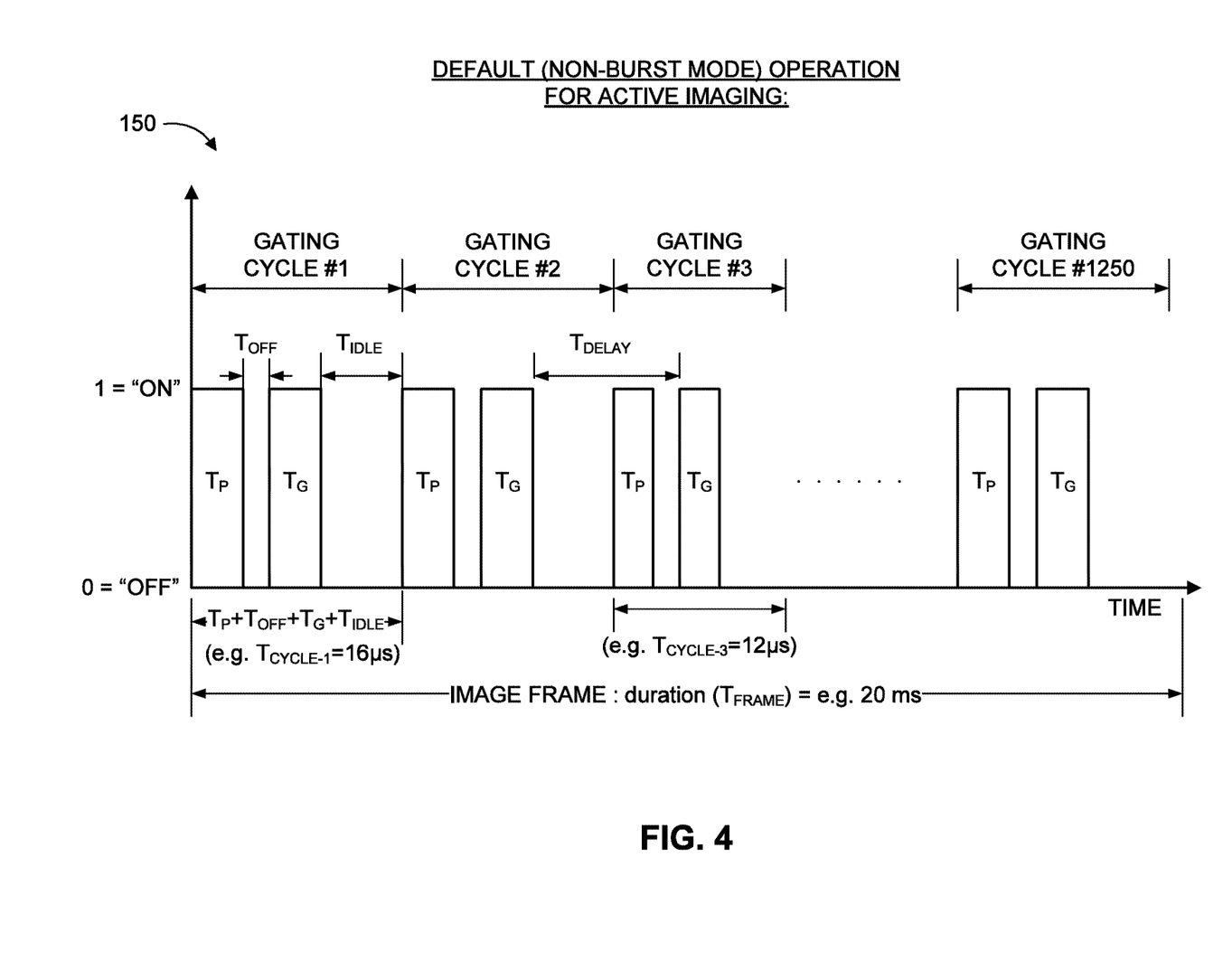
FIG. 4 is an illustration of a timing graph depicting the gating cycles of an individual image frame during default mode operation of the imaging system of FIG. 1, operative in accordance with an embodiment of the present invention.
Figure 5:
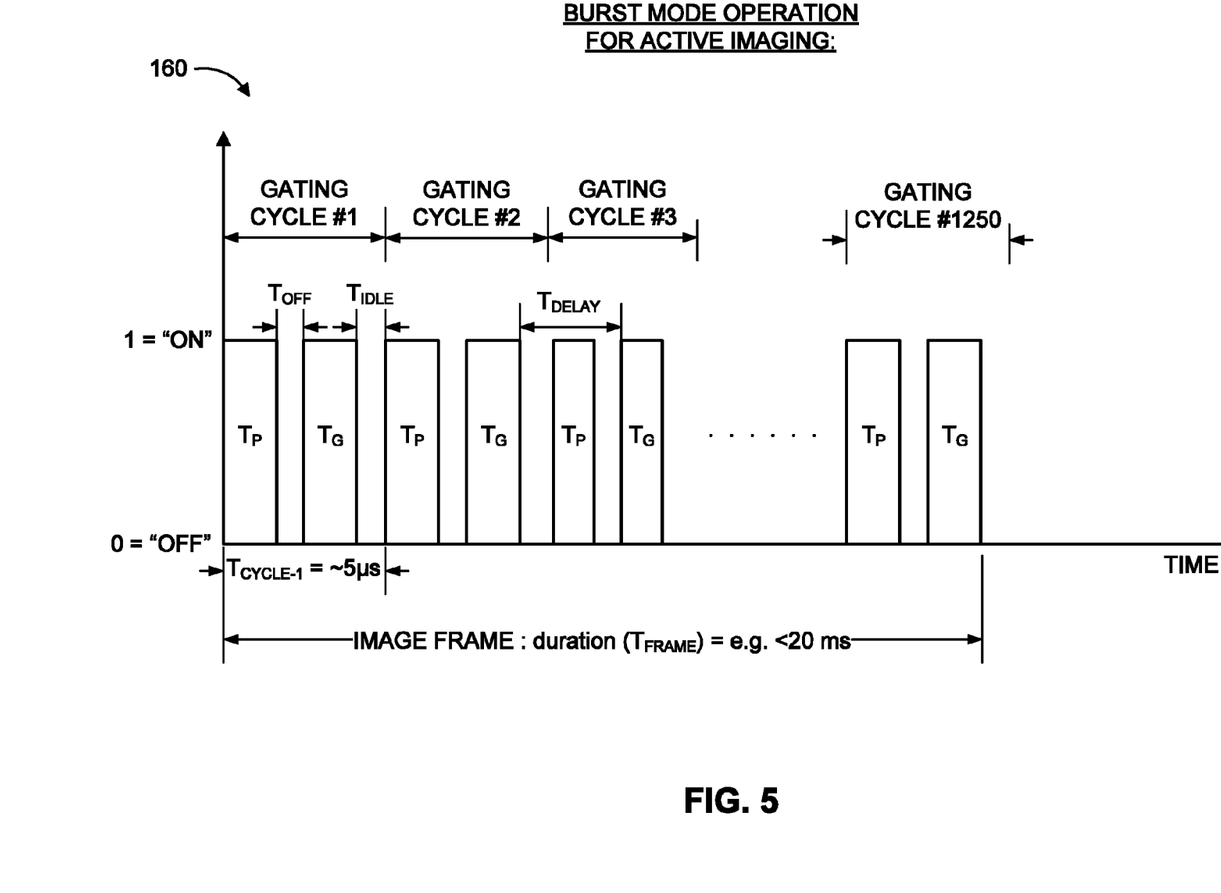
FIG. 5 is an illustration of a timing graph depicting the gating cycles of an individual image frame during burst-mode operation of the imaging system of FIG. 1, operative in accordance with an embodiment of the present invention.

Reference is now made to FIGS. 4 and 5. FIG. 4 is an illustration of a timing graph, generally referenced 150, depicting the gating cycles of an individual image frame during default mode operation of the imaging system of FIG. 1, operative in accordance with an embodiment of the present invention. FIG. 5 is an illustration of a timing graph, generally referenced 160, depicting the gating cycles of an individual image frame during burst-mode operation of the imaging system of FIG. 1, operative in accordance with an embodiment of the present invention. The vertical axis of graphs 150, 160 represents the activation status of a device of imaging system 100 (i.e., of light source 102 or camera 104), where "1" represents a status of the device being in an "on" state, and "0" represents a status of the device being in an "off" state. The horizontal axis of graphs 150, 160 represents time. A gating cycle is defined as the time period required for one laser pulse to be transmitted and for the corresponding reflected photon(s) to be collected. The duration of a gating cycle ($T_{CYCLE}$) is thus provided by: $T_P + T_{OFF} + T_G + T_{IDLE}$, where:

$T_P$=the pulse width (i.e., the duration of an individual transmitted laser pulse 122);

$T_{OFF}$=the duration for which the gated camera 104 remains in an "off" state after the laser pulse 122 has been transmitted;

$T_G$=the duration for which the gated camera 104 is in an "on" state and receives the reflected pulse 124; and $T_{IDLE}$=the duration between the end of a pulse reception in one gating cycle (i.e., immediately after gated camera 104 is switched back "off" after collecting the reflected pulse 124) and the beginning of a pulse emission in the succeeding gating cycle (i.e., when light source 102 begins transmitting a new laser pulse 122).

Additionally, a "delay-time" parameter ($T_{DELAY}$) is defined as the time period in between sensor exposures, in other words the duration between the end of the completion of "$T_G$" in one gating cycle and the beginning of the next "$T_G$" in the subsequent gating cycle (i.e., $T_{DELAY} = T_{G\text{-}cycleN+1} - T_{G\text{-}cycleN}$).

For exemplary purposes, it is assumed that camera 104 operates at a frame rate of 90 Hz, such that 90 frames are captured each second, and the duration of an exemplary image frame is 20 ms. In general, the image frames may vary in duration (e.g. individual frame #1 may be 2 ms, while subsequent individual frame #2 may be 10 ms, etc). The pulse width ($T_P$) and gate exposure duration ($T_G$) is selected in accordance with the depth of field (DOF) to be imaged (as well as other relevant criteria). For example, in a vehicle night vision imaging system, a desired DOF of approximately 15 m would correspond to a gate exposure duration ($T_G$) and pulse width ($T_P$) of approximately 100 ns; and for a DOF of 150 m, the gate exposure duration ($T_G$) and pulse width ($T_P$) would be approximately 1 μs. For an alternative example, in a hand-held imaging device (e.g. in a mobile phone or a hand-held camera), a desired DOF of approximately 1.5 m would correspond to a gate exposure duration ($T_G$) and pulse width ($T_P$) of approximately 10 ns.

If the cycle duration ($T_{CYCLE} = T_P + T_{OFF} + T_G + T_{IDLE}$) is constant with a duration of approximately 16 μs (for the exemplary image frame), then it is possible to have up to 1250 gating cycles (pulse transmissions and collected pulse reflections) in the course of an individual image frame of 20 ms, as shown in graphs 150 and 160. It is noted that the cycle durations may vary over the course of an individual image frame. In particular, each of the parameters: $T_P$; $T_{OFF}$; $T_G$; $T_{IDLE}$; and/or $T_{DELAY}$, may be different during different gating cycles of an individual image frame. For example, gating cycle #3 is depicted in graph 150 as having a cycle duration ($T_{CYCLE\text{-}3}$) of 12 μs, in comparison to the first and second gating cycles of 16 μs duration. It is further noted that there is also a pixel readout time associated with each image frame, which is not depicted in the Figures (FIG. 4, FIG. 5, FIG. 7, FIG. 8). The frame readout period of an image frame make take place during the end of the frame duration (for example, an additional period of, e.g., 1 ms for readout, following the final gating cycle of the frame). Alternatively, readout of a given image frame may occur during the gating cycles (pulse emissions/exposures) of the subsequent image frame.

In accordance with the present invention, the delay-time ($T_{DELAY}$) of at least one gating cycle of an image frame is adaptively controlled in accordance with at least one parameter or environmental condition. The delay-time ($T_{DELAY}$) may be determined as a function of various relevant parameters and criteria, including but not limited to: the pulse width; the pulse intensity; the DOF; the maximum range to be imaged; the sensitivity of the image sensor; the type of scenery/object to be imaged; the type of image processing feature; and/or the camera frame rate. The determination of delay-time may utilize a mathematical equation or formula that incorporates at least some of these parameters, an example of which is provided hereinbelow. In addition, the delay-time ($T_{DELAY}$) may be determined as a function of environmental conditions associated with the imaging system 100. Possible environmental conditions may include: the time when imaging system is operating (e.g., day or night); the location where imaging system 100 is operating (e.g., indoor, urban or rural environment); the weather or climate conditions (e.g., sun, rain, fog, snow, smog, dust); the type of platform where imaging system 100 is situated; the particular application for which imaging system 100 is being used; the level of ambient light and/or extraneous light sources in the vicinity of imaging system 100 (e.g., the presence of an oncoming vehicle with its own active imaging system); the planned duration of an operational session (e.g., the expected driving distance); and the like.

The delay-time ($T_{DELAY}$) is adaptively controlled, such that it can be increased or decreased (e.g., in real-time) when a relevant environmental condition associated with imaging system 100 changes. It is noted that there are certain inherent constraints that limit the amount by which the delay-time (or other parameters of the gating cycle) can be decreased. One such constraint is the laser driver 134 of light source 102. In particular, a sufficient time must have elapsed for the laser driver 134 to have accumulated sufficient electrical charge (energy) in its capacitors (or an alternative energy storage mechanism) before it can proceed to transmit the subsequent laser pulse, in order to achieve a desired peak power (such as a few hundred Watts for imaging of up to hundreds of meters). Therefore, the difference between the timing of pulse emissions in successive gating cycles (i.e., $T_{P\text{-}cycleN+1} - T_{P\text{-}cycleN}$), and thus the timing of the next sensor exposure ($T_{G\text{-}cycleN+1}$), is intrinsically limited by the time required for the laser driver capacitor to recharge.

Another inherent constraint that limits the amount by which the delay-time can be decreased is the DOF to be imaged in a given gating cycle, since the sensor exposure must be delayed for at least the amount of time required for the entire pulse to reach and be reflected back from the maximum range in that DOF. Thus, the timing of the sensor exposure in the next gating cycle ($T_{G\text{-}cycleN+1}$), is intrinsically limited by the time required for the pulse to propagate through this range (which, in turn is also a function of the pulse width and other parameters).

Imaging system 100 may operate in a mode in which the delay-time $T_{DELAY}$ (and thus the cycle duration time $T_{CYCLE}$) is substantially minimized, to a duration that is still feasible given the inherent constraints as well as the parameters and environmental conditions associated with imaging system 100. This operational mode is also referred to herein as "burst mode" operation. Imaging system 100 may alternatively operate in a "default" operational mode, in which the cycle duration ($T_{CYCLE}$) is not substantially minimized, i.e., where $T_{DELAY}$ is capable of being reduced further given the inherent constraints, existing parameters and environmental conditions. Referring to timing graph 160 (FIG. 5), imaging system operates in a burst mode in which the duration of $T_{DELAY}$ (depicted for the first three gating cycles) is substantially shorter than the corresponding $T_{DELAY}$ of timing graph 150 (FIG. 4). As a result, the cycle duration ($T_{CYCLE}$) of timing graph 160 (in burst-mode operation) is substantially shorter than the cycle duration ($T_{CYCLE}$) of timing graph 150 (in default-mode operation). For example, for imaging a range of up to hundreds of meters, $T_{CYCLE}$ may be reduced from approximately 16 μs in graph 150 to approximately 5 μs in graph 160, in accordance with the present invention. For example, the delay-time ($T_{DELAY}$) may be reduced to approximately 2-3 μs in burst-mode operation when imaging a maximum range of approximately 250 m with a DOF of approximately 75 m. Imaging system 100 may switch between default-mode operation and burst-mode operation, as required. The operational mode of imaging system 100 may also be adaptively controlled in accordance with the relevant parameters and environmental conditions associated with imaging system 100, such as the exemplary parameters and environmental conditions described hereinabove. For example, if the level of ambient light in the vicinity of imaging system 100 is above a threshold value, then system 100 is directed to operate in burst-mode, and if the ambient light is below the threshold value then system 100 is directed to operate in default-mode.

It is appreciated that the burst-mode operation of imaging system 100, with a reduced delay-time, results in a very short time for the integration of extraneous light sources during the sensor non-exposure period, and thus reduces the phenomenon of residual photon entry into the image sensor during the non-exposure (i.e., non-$T_G$) periods. Burst-mode operation also results in a shorter overall frame duration ($T_{FRAME}$) for a given number of gating cycles, corresponding to an effectively higher image frame rate of the camera, as well as allowing for improved power consumption management of the system components (e.g., light source 102 and camera 104). Burst-mode operation also allows for multiple platforms with the imaging system of the present invention operating together, as the image frame duration ($T_{FRAME}$) is reduced so the overall OFF time ($T_{OFF}$ for all cycles) is larger, thereby reducing the likelihood that a given light emission of one imaging system would result in residual photon noise (or other undesirable electro-optical phenomena, such as saturation or blooming) in the other imaging system. One technique for exploiting the additional overall OFF time is by using random hopping, by changing the start point of an image frame and/or changing the timing of the gating cycles within an image frame. Finally, burst-mode operation allows for using less pulses per image frame and/or a lower power light source 102 (i.e., having lower overall average power and/or moderate peak power capabilities), which is preferable from a laser safety standpoint. This is due to the fact that the phenomenon of "leakage photons" is reduced to a minimum, so preserving the same signal-to-noise ratio (SNR) of an image frame can be achieved with fewer light source pulses and/or a lower peak power pulse and/or a different light pulse shape.

Figure 6:
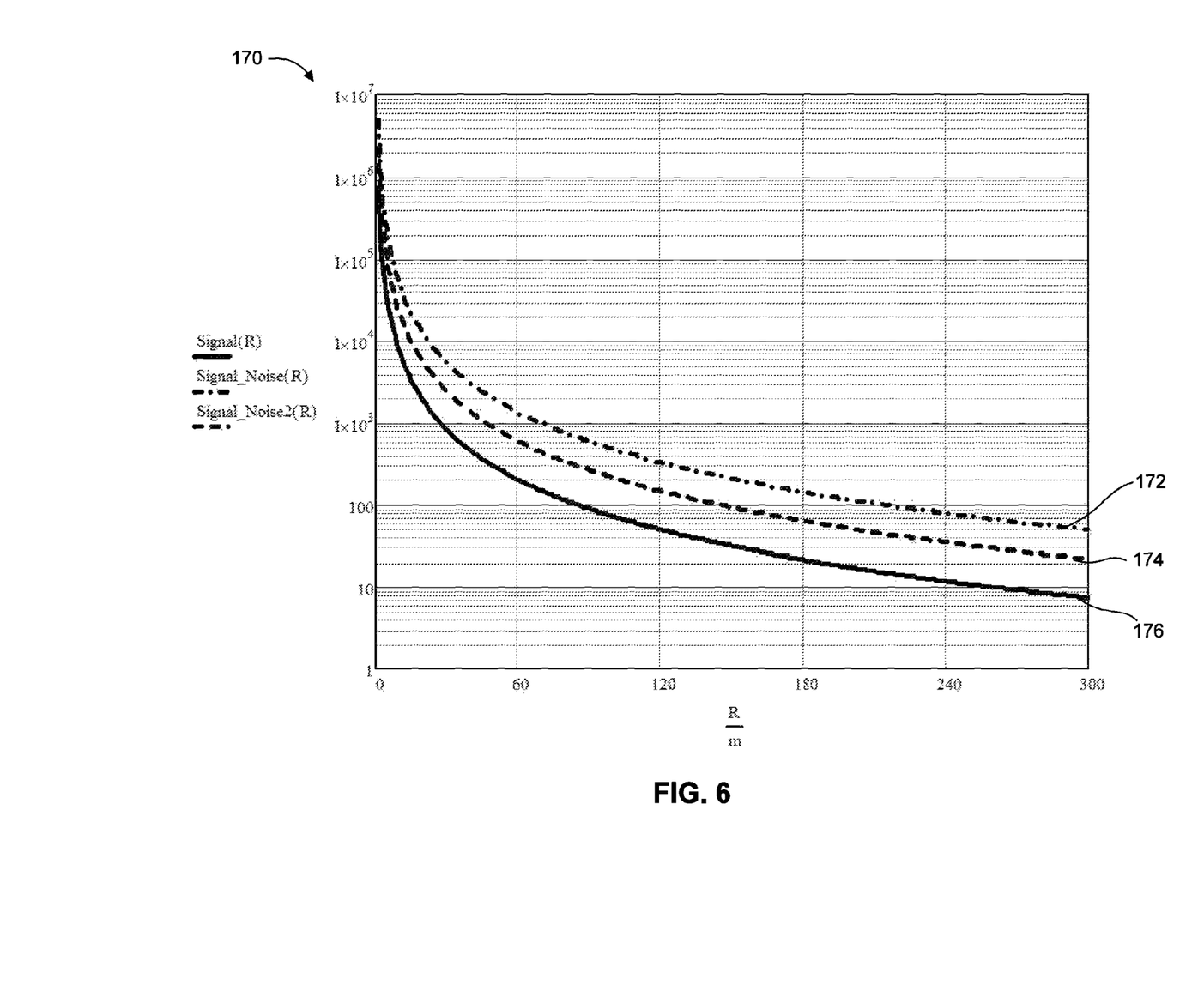
FIG. 6 is a graph of typical signal levels and residual photon noise as a function of distance from imaged objects for different system operational modes, in accordance with an embodiment of the present invention.

Reference is now made to FIG. 6, which is a graph, generally referenced 170, of typical signal levels and residual photon noise as a function of distance from imaged objects for different system operational modes, in accordance with an embodiment of the present invention. The vertical axis of graph 170 represents the signal level (amount of electrons) accumulated per image frame, whereas the horizontal axis of graph 170 represents the range (R) in meters (m) of the imaged object from the imaging system. Waveform 172 of graph 170 represents the signal values of residual noise obtained when imaging an oncoming vehicle with an imaging system of the present invention operating in default-mode (i.e., non burst-mode). Waveform 174 of graph 170 represents the signal value of residual noise obtained when imaging an oncoming vehicle with an imaging system of the present invention operating in burst-mode. Waveform 176 of graph 170 represents the signal value obtained when imaging a pedestrian with the imaging system of the present invention (in any operational mode), used as a reference for the other two waveforms 172, 174. As seen in graph 170, the noise resulting from residual photon entry when imaging an oncoming vehicle is substantially lowered when operating in burst-mode.

The following is an example of how different parameters may be taken into account when determining a delay-time for a gating cycle. Considering an exemplary camera having the following parameters:
General Parameters:
 object reflectance: rt arg et=0.3;
 height from sea level: H=100 m;
 visibility range: Vis=25 km;

attenuation coefficient correction:

$$Kh = 0.96 \cdot e^{(\frac{-H}{3}) \cdot 0.132 \cdot 10^{-3} \cdot ft^{-1}};$$

attenuation coefficient:

$$\gamma = \frac{-\ln(0.02)}{Vis} \cdot \left(\frac{\lambda}{0.55 \, \mu m}\right)^{-1.3} \cdot Kh;$$

Camera Parameters:
 optical transmittance: $T_{optic}$=0.9;
 F-number: Fnum=1.2
 sensor exposure duration (single gating, $T_G$): $T_g$=100 ns;
Gated CMOS Image Sensor Parameters:
 sensor pitch: d=10 μm;
 quantum efficiency: QE=0.8;
 wavelength: λ=850 nm;
 sensitivity:

$$Sens = \frac{QE \cdot electron \cdot \lambda}{h \cdot c}$$

Light Source Parameters (in this Example a Laser Source)
 laser peak power: $P_{laser}$=750 W;
 optical transmittance: $\tau_{laser}$=1;
 horizontal field of illumination: $\theta_{laser}H$=24 deg;
 vertical field of illumination: $\theta_{laser}V$=8 deg;
 pulse shape: η=1.
The electrons per a single gating cycle (i.e., a single laser pulse and a single gate exposure) for a diffusive object may be provided by the following formula, where R represents the range (typically the mid-range of the desired depth of field):

$$ElecPerGate(R) = \frac{Sens \cdot \frac{P_{laser} \cdot \tau_{laser}}{\pi \cdot \left(\tan\left(\frac{\theta_{laser}}{2}\right) \cdot \tan\left(\frac{\theta_{laser}V}{2}\right) \cdot R^2\right)} \cdot \frac{Toptic \cdot rtarget \cdot e^{-2 \cdot \gamma \cdot R}}{4 \cdot Fnum^2} \cdot \eta \cdot Tg \cdot d^2}{electron}$$

Therefore, based on the aforementioned exemplary parameters:

ElecPerGate(50 m)=10

ElecPerGate(160 m)≈1

This value corresponds to the quantity of photoelectrons (or electrons) that enter the photodetector of an image sensor array pixel and are converted into an image pixel memory mechanism (e.g., memory node) per received reflected pulse (i.e., electrons collected by the memory mechanism for each pulse). If the image sensor undergoes no gain (i.e., if there is no intensification of the incident photons or intensification of the photoelectron), then each photon is converted into an electron in a linear manner. In this case, if the quantity of electrons is less than one (1), then the incident photon would be considered noise (no signal detected). If, however, the image sensor undergoes gain, such as in an avalanche photodiode (APD) sensor, then the sensitivity of the image sensor is far greater, which would require substantially prolonging the delay-time. It is noted that the threshold of a single electron (below which the incident photon is considered noise) is provided as an example only, as different sensors may be characterized with different sensitivities. The above example demonstrates the amount of time required to wait in between sensor exposures, for a given peak power and other relevant parameters, in order to avoid receiving reflections of a previous pulse from a given range, thereby establishing the minimal duration before starting the exposure period ($T_G$) of the next gating cycle.

According to an embodiment of the present invention, imaging system 100 includes multiple laser sources 102, each with its associated laser diode 132 and laser diode driver 134, such that different ones of the laser sources 102 can transmit laser pulses 122 in different gating cycles, allowing for pulse transmissions even when a laser driver 134 of another light source 102 is still in its "resting phase". In other words, the timing of the activation of different laser sources 102 is synchronized, by staggering the respective pulse transmissions in alternating or overlapping intervals. In this manner, the idle-time ($T_{IDLE}$) and delay-time ($T_{DELAY}$), and thus the overall cycle duration $T_{CYCLE}$ (and frame duration), can be further minimized, in spite of the intrinsic constraints arising from an individual laser driver.

According to another embodiment of the present invention, the pulse width and/or cycle durations are varied within an individual frame, allowing to further reduce the overall frame duration. For example, if an image frame includes 1000 gating cycles, then a certain percentage of them (e.g., 700 cycles) may be dedicated to a farther DOF while the remaining percentage (e.g., 300 cycles) are dedicated to a shorter DOF. Consequently, for the 700 cycles the sensor exposure timing would need to wait for at least the duration required for the entire pulse to propagate to and back from the farther DOF, meaning a longer delay-time associated with those cycles, whereas for the other 300 cycles the required wait time is shorter and thus the delay-time for these cycles can be minimized further. In addition, imaging system 100 may implement shorter exposure slices for pulses dedicated to shorter DOFs while waiting for the longer delay-times of the pulses dedicated to longer DOFs, in order to obtain multiple slices (DOFs) in the same frame.

Furthermore, imaging system 100 may use pulses at different wavelengths intended for different pixels of image sensor 112 (i.e., such that certain array pixels are directed to collect only certain reflected pulses, depending on the wavelength). This configuration allows imaging system 100 to image multiple DOFs simultaneously and/or to obtain multispectral information in a single image frame.

According to a further embodiment of the present invention, imaging system 100 may include multiple cameras 104 and image sensors 112, such that different ones of the image sensors 112 can collect reflections of different transmitted laser pulses 122 in different gating cycles. For example, 3D information (i.e., a stereoscopic image) can be extracted using a triangulation and/or pulsing/gating scheme.

Figure 7:
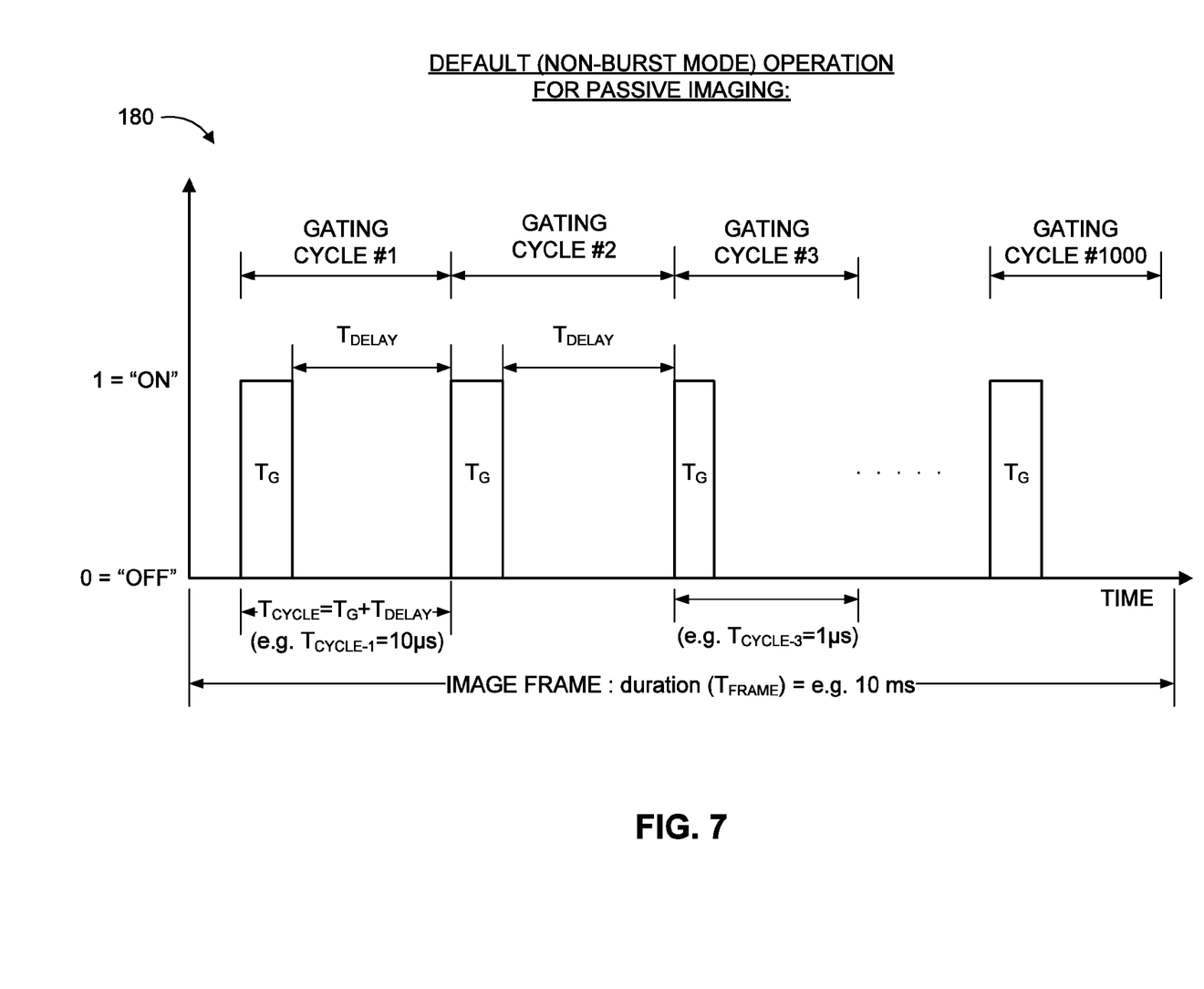
FIG. 7 is an illustration of a timing graph depicting the gating cycles of an individual image frame during default mode operation of a passive imaging system, operative in accordance with an embodiment of the present invention.
Figure 8:
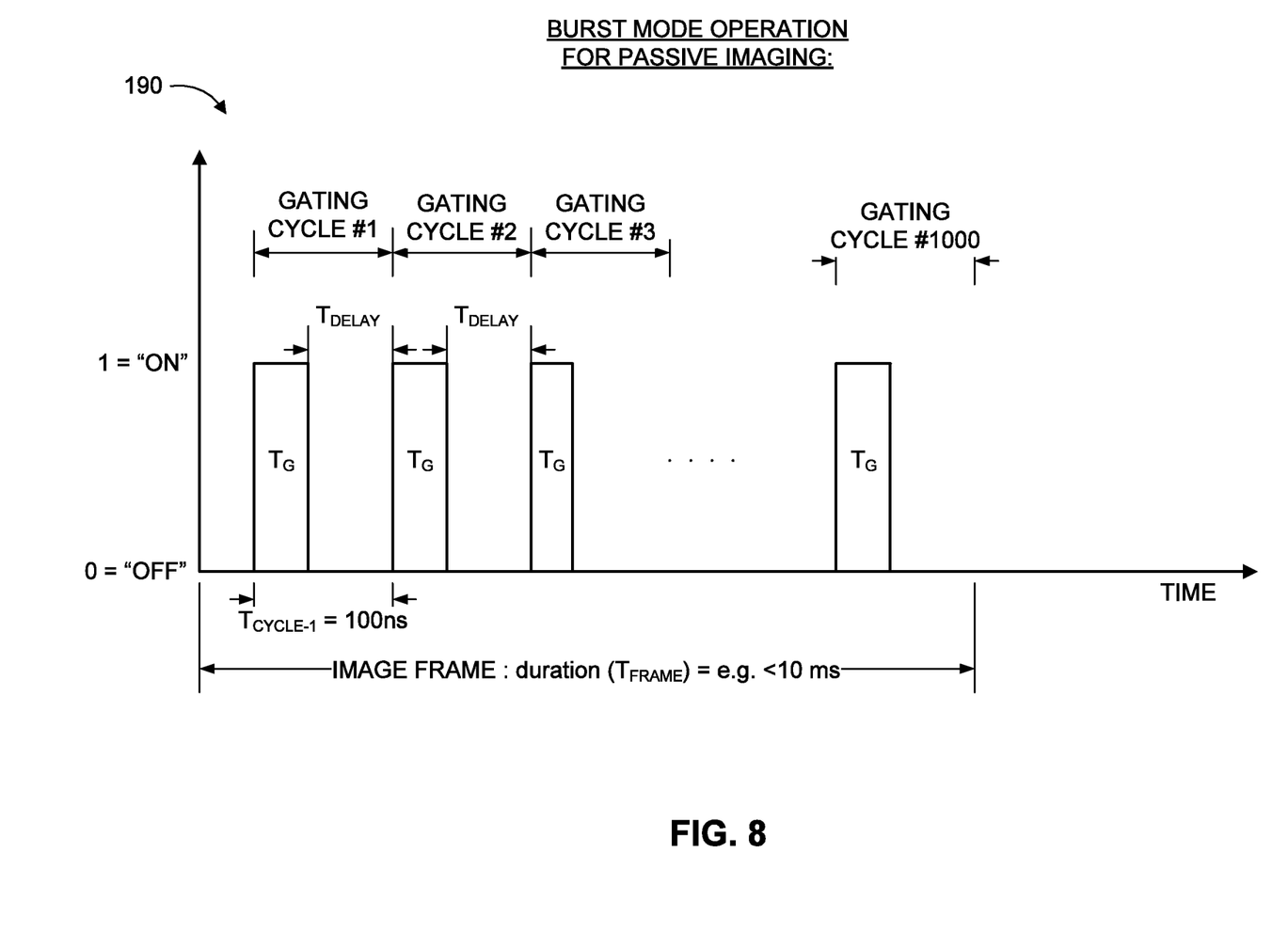
FIG. 8 is an illustration of a timing graph depicting the gating cycles of an individual image frame during burst-mode operation of a passive imaging system, operative in accordance with an embodiment of the present invention.

According to yet another embodiment of the present invention, a minimized delay-time may also be applied to a passive imaging system, in which an image sensor detects radiation emitted by objects in the imaged FOV (i.e., rather than detecting reflections from light pulses emitted by a light source, as in active imaging system 100). Reference is now made to FIGS. 7 and 8. FIG. 7 is an illustration of a timing graph, generally referenced 180, depicting the gating cycles of an individual image frame during default mode operation of a passive imaging system, operative in accordance with an embodiment of the present invention. FIG. 8 is an illustration of a timing graph, generally referenced 190, depicting the gating cycles of an individual image frame during burst-mode operation of a passive imaging system, operative in accordance with an embodiment of the present invention. Graphs 180, 190 are analogous to graphs 150, 160 (FIGS. 4 and 5), but directed to a passive imaging system (i.e., which detects radiation in the imaged environment without a light source emitting light pulses), rather than an active imaging system. Graphs 180, 190 depict an exemplary image frame acquired by a passive imaging system, where the frame duration ($T_{FRAME}$) is 10 ms and the frame includes a total of 1000 gating cycles. In a passive imaging system, the cycle duration ($T_{CYCLE}$) consists of only the exposure duration ($T_G$), and the delay-time ($T_{DELAY}$) is defined as the duration between successive sensor exposures (i.e., $T_{DELAY}=T_{G\text{-}cycleN+1}-T_{G\text{-}cycleN}$). Thus, the delay-time ($T_{DELAY}$) of a passive imaging system may also be adaptively controlled in accordance with at least one environmental condition, such as the exemplary environmental conditions described hereinabove. However, in a passive imaging system, the only limitations for minimizing $T_{DELAY}$ are physical, such as the sensor exposure mechanism (i.e., shuttering capabilities, the electron transfer time to the pixel memory node, and the like), since there is no need to wait for the propagation time of a transmitted pulse when establishing the timing of a sensor exposure in a gating cycle. As is evident from timing graphs 180 and 190, the delay-time duration ($T_{DELAY}$), and thus the cycle durations ($T_{CYCLE}$) and the overall frame duration ($T_{FRAME}$), are reduced in the burst-mode operation (graph 190) relative to the default-mode operation (graph 180). For example, the cycle duration ($T_{CYCLE}$) of gating cycle #1 is reduced from 10 μs in default-mode operation to 100 ns in burst-mode operation. For example, the cycle duration ($T_{CYCLE}$) may be reduced to approximately 10-100 ns in burst-mode operation in a passive imaging system.

It is noted that the present invention may also be applied to address the blurring effect in images of moving objects. In particular, by providing a gated sensor operating at controllably minimized "OFF" durations, such a gated sensor can be used to mitigate the motion blurring, similar to the coded exposure photography technique of rapidly opening and closing the camera shutter throughout the exposure duration.

The present invention is applicable to any kind of imaging for any purpose and may be employed in a wide variety of applications, such as, for example, various industrial, commercial, medical, security, or recreational applications. The present invention may be applied to the detection and identification of a target or object of interest, or more generally, for any kind of acquisition of visual information. The present invention is applicable to imaging in any range of a depth of field, such as substantially short ranges (e.g., on the order of tens or hundreds of meters), substantially medium ranges (e.g., on the order of tens or hundreds of kilometers), or very short ranges (e.g., on the order of centimeters, millimeters, or less).

At least a portion of the imaging system of the present invention may be mounted on a moving platform, such as a vehicle. For example, the imaging system of the present invention may be used as a vehicle day/night vision system. The term "vehicle" should be broadly interpreted to refer to any type of transportation device, such as an automobile, motorcycle, truck, aircraft, boat, ship, and the like. Similarly, the imaging system may alternatively be mounted, partially or entirely, on a non-vehicular portable platform (e.g., a camera dolly, being carried by one or more persons), or on a stationary platform (e.g., a security fence, a surveillance perimeter, and the like).

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. An active imaging system comprising:
at least one light source, configured to emit a series of light pulses toward a region of interest;
at least one image sensor comprising an array of photodetectors, configured to receive reflections of said pulses reflected from objects located in at least one depth of field (DOF) to be imaged, and to convert said reflections into an image,
wherein each frame of said image comprises a plurality of gating cycles, each of said gating cycles comprising the emission of a respective pulse of said series of light pulses, and the reception of reflections of said respective pulse by said image sensor, and wherein a delay-time ($T_{DELAY}$) is defined as the duration between the sensor exposure periods of successive gating cycles; and
a controller, coupled with said light source and with said image sensor, said controller configured to control the operation of said light source and of said image sensor, and to minimize said delay-time ($T_{DELAY}$) for at least one gating cycle of an image frame, wherein said delay-time ($T_{DELAY}$) is adaptively determined in accordance with at least one system parameter or environmental condition.

2. The imaging system of claim 1, wherein said system parameter is selected from the list consisting of:
the pulse width of said pulse;
the pulse intensity of said pulse;
the pulse shape of said pulse;
the depth of field (DOF);
the maximum range to be imaged;
intrinsic parameters of said light source;
intrinsic parameters of said image sensor;
the sensitivity of said image sensor;
the frame rate of said image sensor;
the type of scenery to be imaged;
a type of image processing feature;
a mathematical formula; and
any combination of the above.

3. The imaging system of claim 1, wherein said environmental condition is selected from the list consisting of:
the time of operation;
the location of operation;
weather or climate conditions;
type of platform containing said imaging system;
type of application of said imaging system;
the level of ambient light;
the presence of extraneous light sources in the vicinity;
the planned duration of an operational session; and
any combination of the above.

4. The imaging system of claim 1, wherein said delay-time ($T_{DELAY}$) is in the range of 2-3 μs.

5. The imaging system of claim 1, comprising a plurality of light sources, each being configured to emit a respective pulse for a different gating cycle of said image frame, such that the timing of the pulse emissions from different light sources is staggered.

6. The imaging system of claim 1, wherein at least one frame of said image comprises a plurality of gating cycles with varying cycle durations ($T_{CYCLE}$), such that said delay-time ($T_{DELAY}$) is selectively varied in at least some of said gating cycles.

7. The imaging system of claim 6, wherein the cycle duration ($T_{CYCLE}$) of at least a portion of said gating cycles that are dedicated to a farther DOF is longer than the cycle duration ($T_{CYCLE}$) of at least another portion of said gating cycles that are dedicated to a shorter DOF.

8. The imaging system of claim 1, wherein said pulses emitted by said light source comprises a plurality of pulse wavelengths, respective of different pixels of said array of photodetectors of said image sensor.

9. The imaging system of claim 1, further comprising at least one filter, configured to filter said received reflections from reaching said image sensor according to selected filtering criteria.

10. The imaging system of claim 1, further comprising a display, configured to display the generated image.

11. A vehicle, comprising the imaging system of claim 1.

12. A plurality of imaging systems as claimed in claim 1, said imaging systems operating together in a common environment.

13. The plurality of imaging systems of claim 12, wherein the timing of parameters relating to an image frame of at least one of said imaging systems is determined in accordance with a random hopping scheme.

14. A passive imaging system comprising:
at least one image sensor comprising an array of photodetectors, configured to receive radiation emitted or reflected from objects located in a region to be imaged, and to convert said received radiation into an image,
wherein each frame of said image comprises a plurality of gating cycles, each of said gating cycles comprising a respective exposure period of said image sensor, and wherein a delay-time ($T_{DELAY}$) is defined as the duration between the sensor exposure periods of successive gating cycles; and
a controller, coupled with said image sensor, said controller configured to control the operation of said image sensor, and to minimize said delay-time ($T_{DELAY}$) for at least one gating cycle of an image frame, wherein said delay-time ($T_{DELAY}$) is adaptively determined in accordance with at least one system parameter or environmental condition.

15. The imaging system of claim 14, wherein said system parameter is selected from the list consisting of:
intrinsic parameters of said image sensor;
the sensitivity of said image sensor;
the frame rate of said image sensor;
the type of scenery to be imaged;
a type of image processing feature;
a mathematical formula; and
any combination of the above.

16. The imaging system of claim 14, wherein said environmental condition is selected from the list consisting of:
the time of operation;
the location of operation;
weather or climate conditions;
type of platform containing said imaging system;
type of application of said imaging system;
the level of ambient light;
the presence of extraneous light sources in the vicinity;
the planned duration of an operational session; and
any combination of the above.

17. A method for active imaging, the method comprising the procedures of:
- emitting a series of light pulses toward a region of interest, using at least one light source;
- detecting the reflections of said pulses reflected from objects located in at least one depth of field (DOF) to be imaged, and converting said reflections into an image, using at least one image sensor,
- wherein each frame of said image comprises a plurality of gating cycles, each of said gating cycles comprising the emission of a respective pulse of said series of light pulses, and the reception of reflections of said respective pulse by said image sensor, and wherein a delay-time ($T_{DELAY}$) is defined as the duration between the sensor exposure periods of successive gating cycles; and
- minimizing said delay-time ($T_{DELAY}$) for at least one gating cycle of an image frame, wherein said delay-time ($T_{DELAY}$) is adaptively determined in accordance with at least one system parameter or environmental condition.

18. The method of claim 17, wherein said procedure of minimizing said delay-time ($T_{DELAY}$) comprises selectively varying said delay-time in at least some of the gating cycles of an image frame such that said image frame comprises gating cycles with varying cycle durations ($T_{CYCLE}$).

19. A method for passive imaging, the method comprising the procedures of:
- receiving radiation emitted or reflected from objects located in a region to be imaged, and converting said received radiation into an image, using at least one image sensor,
- wherein each frame of said image comprises a plurality of gating cycles, each of said gating cycles comprising a respective exposure period of said image sensor, and wherein a delay-time ($T_{DELAY}$) is defined as the duration between the sensor exposure periods of successive gating cycles; and
- minimizing said delay-time ($T_{DELAY}$) for at least one gating cycle of an image frame, wherein said delay-time ($T_{DELAY}$) is adaptively determined in accordance with at least one system parameter or environmental condition.

* * * * *